(12) United States Patent
Mowrey et al.

(10) Patent No.: US 7,037,522 B2
(45) Date of Patent: May 2, 2006

(54) NOCTURNAL MUSCLE ENHANCING COMPOSITION AND METHOD

(75) Inventors: Daniel B. Mowrey, Salt Lake City, UT (US); Mauro DiPasquale, Cobourg (CA); Donald K. Layman, Champaign, IL (US); David Holmes, Sumner, WA (US)

(73) Assignee: Western Holdings, L.L.C., Casper, WY (US)

( * ) Notice: Subject to any disclaimer, the term of this patent is extended or adjusted under 35 U.S.C. 154(b) by 424 days.

(21) Appl. No.: 10/256,997

(22) Filed: Sep. 27, 2002

(65) Prior Publication Data

US 2004/0063608 A1    Apr. 1, 2004

(51) Int. Cl.
*A61K 47/00* (2006.01)
*A61K 9/20* (2006.01)
*A61K 9/22* (2006.01)
*A23J 1/00* (2006.01)

(52) U.S. Cl. ............... 424/468; 424/439; 424/464; 426/656

(58) Field of Classification Search ............ 426/665, 426/656; 424/439, 468, 464
See application file for complete search history.

(56) References Cited

U.S. PATENT DOCUMENTS

| 5,637,319 A * | 6/1997 | Takada .................... 424/463 |
| 6,506,422 B1 * | 1/2003 | Masson et al. ............... 426/2 |
| 2003/0215506 A1 * | 11/2003 | Kuhrts ...................... 424/468 |
| 2005/0074490 A1 * | 4/2005 | Lin et al. .................. 424/468 |

FOREIGN PATENT DOCUMENTS

EP        1082961 A1 *   3/2001

OTHER PUBLICATIONS www.Dictionary.com.*
Barbanti et al., "Effects of fast disintegrating/rapid release oral formulation of sumatriptan on functional ability in patients with migranes," 2004, Curr. Med. Res. Opin. 20 (12): 2021-9.*

* cited by examiner

*Primary Examiner*—Thurman K. Page
*Assistant Examiner*—David Vanik
(74) *Attorney, Agent, or Firm*—Morriss O'Bryant Compagni

(57) ABSTRACT

A method and nutrient supplement composition for nocturnal administration to human subjects where the nutrient supplement composition includes both a sustained timed release portion and a rapid release portion, both portions containing a mixture of edible food proteins and edible amino acid building blocks with a portion of these key components being micro encapsulated for sustained timed release in a the human body during the growth hormone spikes that generally occur during nocturnal sleep.

19 Claims, No Drawings

NOCTURNAL MUSCLE ENHANCING COMPOSITION AND METHOD

FIELD OF THE INVENTION

This invention relates to health supplements and, more particularly, to novel systems and methods for counteracting nocturnal post-absorptive muscle catabolism using slowly assimilated proteins, herbs, and minerals.

BACKGROUND

Nocturnal Post-Absorptive Muscle Catabolism, known in bodybuilding circles as "NPMC", is a subject very few trainers and bodybuilding experts know how to address. It is widely known that NPMC reduces muscle growth during what should be the most productive muscle-building cycle: during sleep. In the past, there has been nothing that could be done about this phenomena.

NPMC is a naturally occurring phenomena in the human body. It occurs every night during the later hours of sleep, after the release of the body's growth hormone has abated, and drastically cuts the body's ability to synthesize new protein.

Understanding the causes of NPMC requires returning to the fundamental understanding of how and why the human body builds muscle. When a person stresses his or her muscles past their normal capacity, microscopic "rips" or "tears" are produced deep in muscle tissue. Repairing these rips or tears during recovery adds mass (growth) to the muscles. Recovery, therefore, is an essential concept to producing muscle growth and is achieved, in part, by proper rest.

Another key to achieving muscle growth and repair is having an adequate supply of available proteins when growth hormone is released by the body. Important to this concept is that about 90% of the body's daily supply of growth hormone is released during the first four (4) hours that a person sleeps. Thus, during this all-important period of sleep, compound proteins and nutrients need to be made readily available to muscles, so that the body can successfully perform the muscle-repairing, muscle-rebuilding processes that ultimately result in increased muscle size and strength.

"High Tech" protein supplements in the forms of solid foods and drinks abound. Therefore, one might naturally attempt to wake up during the night to consume one of the many protein supplements during this four (4) hour "peak" of growth hormone production. The fact is, this method does not work and may actually be counterproductive to gaining lean muscle mass. This is because high-tech protein compounds, by their very nature, have been designed and developed for rapid absorption.

Highly specialized "workout" proteins, while effective in enhancing muscle growth when used just before and just after strength training, can't help overcome sleep-induced muscle catabolism because they are assimilated so rapidly. In addition, their proteins are rapidly used up after only the first hour or so of sleep, leaving little protein to be used as "muscle-building blocks" during the most productive period of "Delta" (slow-wave) sleep, when about 90% of the body's growth hormone is released. Waking up in the middle of the night to consume another serving of a typical "high tech" protein supplement is ultimately counterproductive, since the practice results in disruption of sleep patterns, increased cortisone and decreased testosterone. These "stress factors" greatly reduce the probability that the protein serving will contribute to protein synthesis and will also disrupt whatever constructive synthesis may be taking place at the moment of waking. The only viable solution to the problem is invention envisioned herein, whereby proteins, fats and carbohydrates are provided in a manner that doesn't disrupt slow wave sleep, GH release or IG-F metabolism, but in fact helps to promote them.

Therefore, in order to combat NPMC and maximize muscle growth, necessary proteins and nutrients need to be provided to the body to utilize during this growth hormone "spike" and subsequent increase in endogenous IGF-I levels that occurs secondary to the growth hormone a spike and lasts for several hours. Providing proteins and nutrients throughout the night time period is important in order to make full use of the anabolic and anticatabolic properties of both GH and IGF-I In this way, muscle and strength loss due to sleep induced catabolism may be reduced. That is, the body needs to be provided with the proper building blocks during the NPMC stage in order to maximize muscle growth.

BRIEF SUMMARY AND OBJECTS OF INVENTION

In view of the foregoing, it is a primary object of the present invention to provide a combined timed-and rapid nocturnal release protein and nutrient composition and a method for oral nocturnal administration of this composition to human subjects to contribute to muscle size and growth in these human subjects, while reducing the effects of nocturnal post-absorptive muscle catabolism.

Consistent with the foregoing objects, and in accordance with the invention as embodied and broadly described herein, both a method and nutrient supplement composition for nocturnal administration are provided where the nutrient supplement composition includes a sustained timed release portion and a rapid release portion, both portions containing a mixture of edible food proteins and edible amino acid building blocks. A portion of these key components are micro encapsulated for sustained timed release in the body during the growth hormone spikes that generally occur during nocturnal sleep. Administration of the sustained release portion acts to complement the components administered in rapid release form. In addition, the supplement of the present invention helps counteract "Nocturnal Post-Absorptive Muscle Catabolism" following the release of growth hormone and subsequently IGF-I in the body due to its sustained and rapid release portions.

SUMMARY OF THE INVENTION

In accordance with this invention, a composition and method of administering this composition to human subjects have been discovered which enhance or promote muscle growth in these human subjects. In this manner a method for building muscle mass (protein) occurs during deep nocturnal sleep when the body produces peak natural growth hormone release by the pituitary gland.

In accordance with this invention, muscle growth is provided during sleep by orally administering a nutritional supplement, containing a mixture of nutritional food proteins and edible amino acids, in two portions to the human subject just prior to retiring for nighttime sleep. The first portion of this mixture is administered in the form of micro encapsulated particles containing this mixture for sustained time release during the sleep period and the second portion of this mixture is administered in the form for rapid release during the sleep period.

In this manner the release of these proteins and amino acids occurs to coincide with the bodies' peak release of natural growth hormones. In this way the NPMC can be reduced and new muscle proteins can be synthesized.

Through the method using the nutritional supplement composition of this invention, muscle mass is built during the period of diurnal sleep cycle popularly known as deep sleep or Delta sleep, in association with the normal diurnal release by the pituitary gland of growth hormone. This nutritional supplement supplies the needed anabolic and anti-catabolic nutrients. This is the precise time of the 24 hour day in which high growth hormone levels are present, which utilize the nutrients for anabolic purposes. In this manner the need to catabolize proteins from other tissues to meet the anabolic demand put on the body by this growth hormone release is substantially reduced.

DETAILED DESCRIPTION OF THE INVENTION

In accordance with this invention, a nutritional supplement composition and method for administering this composition to human subjects is provided to promote or enhance muscle growth by administering the composition so it is effective during the peak hours when proteins are catabolized to meet the bodies by high growth hormone release.

This method comprises orally administering to a human subject, just prior to nighttime sleep, a mixture of nutritional food proteins and edible amino acids at a daily dosage of from about 10 to about 250 grams, preferably from about 10 to about 150 grams and most preferably from about 10 to about 50 grams. This mixture, which contains nutritional food proteins and edible amino acids, can be administered in such a way that a portion of this mixture of nutritional food proteins and edible amino acids is micro encapsulated for sustained release while the remaining or second portion of this mixture is in a form for simple, rapid release. These two portions can be orally administered in two separate doses or administered as a single oral dose. For example these two potions can be taken together as a powder which is mixed with an edible liquid, such as, water, milk, juice, etc. and drunk before going to bed. When the compositions of this invention are prepared as a powder in a single unit dosage form they contain from about 10 to about 250 grams of the aforementioned mixture of nutritional food proteins and edible amino acids. Generally it is preferred that these unit dosage forms contain these mixtures in an amount of from about 10 to about 100 grams and most preferably from about 10 to about 50 grams. In the case where the mixture is administered as a powder for addition to an edible liquid, the powdered composition containing the mixture of nutritional food proteins and edible amino acids can be formulated as individual packets which contain from about 10 grams to about 50 grams of this mixture On the other hand, the powdered mixture can be formulated into any conventional unit oral dosage form such as tablets, capsules, etc. If desired these unit dosage forms containing both the time release and the rapid release form can be prepared in divided unit dosage forms so that when administered they can provide a total dose of from about 10 to about 50 grams of the mixture to the subject on a daily basis before the subject retires to sleep. Through the use of these oral unit dosage forms, a combination of the mixture of nutritional food proteins and edible amino acids in sustained and rapid release forms is administered which maintains the proper adjustments of this mixture in the body to enhance muscle growth during the period of deep sleep associated with peak natural growth hormone release.

In accordance with this invention, the composition should be administered during nighttime just before the human subject retires to bed for extended sleep. Generally, the mixture is administered within two hours prior to retiring for nocturnal sleep. In general, best results are achieved when the mixture is administered within one half hour prior to retiring for nocturnal sleep.

It has been found that best results are achieved when the nightly administration occurs where the mixture contains from about 15% to about 70% by weight of the mixture (preferably from about 30% to 70% by weight) of nutritional food proteins and edible amino acids administered in the sustained release form, i.e., in the micro encapsulated form and the remainder of the mixture being administered in said rapid release form. While good results are achieved through the use of these proportions of the sustained release to the rapid release forms of the mixture, it is preferred to utilize approximately equal proportions of this mixture for a given nightly administration, i.e., from about 45% to about 55% by weight being administered in the slow release form with the remainder of the mixture being administered in rapid release form.

In addition, the results of this invention are achieved by providing a mixture, which contains from about 10% to about 95% by weight of the mixture of the edible nutritional food proteins and the remainder, i.e., from about 5% to about 90% by weight of mixture, of the edible dietary amino acids. However, best results are achieved by providing a mixture of from about 65% to about 95% of the protein with the remainder being the amino acids in an amount of from about 5% to about 35% by weight of the mixture. In accordance with this invention any of the conventional, nutritional proteins contained in food can be utilized to provide the proteins in this mixture. Among the preferred proteins are milk proteins, whey proteins, wheat proteins, soy proteins or mixtures thereof. These edible food proteins are the important proteins in muscles building. Furthermore, any of the conventional amino acids which are edible can be utilized in this invention. Among the preferred amino acids are the essential amino acids, i.e., leucine, lysine, threonine, isoleucine, valine, phenylalanine, methionine or tryptophan, as well as conventional edible dietary amino acids such as arginine, cysteine, cystine, glutamine, histadine, alanine, aspartic acid, asparagine, glycine, ornithine, serine, proline, tyrosine or mixtures thereof.

In preparing micro encapsulated sustained release portion containing the mixture of dietary proteins and amino acids, any conventional means of microencapsulating this powdered mixture in a sustained release coating or semi-permeable membrane can be utilized. Microencapsulation is a known method whereby tiny particles of gas, liquid or solid, used as the active ingredient are enclosed in a secondary material in order to shield the active ingredient from its surrounding environment. The microcapsules of this invention may measure from about two microns to several millimeters for the purpose of releasing the mixture of nutritional food proteins and edible amino acids in a sustained manner. General procedures for forming microcapsules for sustained release dispensing of pharmaceuticals are disclosed in various U.S. patents such as U.S. Pat. No. 5,192,549 and are conventional in the art. They utilize organic polymers which are tough yet flexible and form the outer skin for final microcapsule. In accordance with the composition of this invention, these microcapsules are solid and can be mixed together with the second or rapid release portion to form a powder that can be utilized for administering the dietary proteins and amino acids mixture. As previously pointed out these powders can be used as individual packets or further formulated into oral dosage forms if desired in accordance with usual tablet or capsule forming methods.

In accordance with a further embodiment of this invention, various ingredients which enhance the activity of this composition can be added to the composition to augment or enhance the properties of the aforementioned mixture. In accordance with a preferred embodiment of this invention, the composition contains in addition to the mixture, conventional anabolic materials suitable for human ingestion in an amount of from about 2% to about 10% by weight of the total composition. Any conventional anabolic material, suitable for human ingestion, can be utilized such as vitamin B6, zinc chelazome and magnesium aspartate. Generally these materials are present in the rapid release portion in an amount of from about 2% to about 10% by weight based upon the weight of the entire composition. In these compositions these dietary edible anabolic agents enhance the activity of the protein and amino acid mixture in building body mass. They also increase protein synthesis. In addition to anabolic agents it is preferred that the composition contain nutritional agents such as micronutrients. These micronutrients are present in the rapid release portion in an amount of from about 0.1% to 2% by weight of the total composition. Any conventional edible or dietary micronutrients such as vitamin A, vitamin E, selenium and copper can be present. The micronutrients also enhance the synthesis of proteins. Additionally, if desired the composition may contain nutritional agents such as dietary fats and carbohydrates that aid in the anabolic functions. These dietary fats and carbohydrates are usually present in the rapid release potion of this composition in an amount of from about 5% to 25% by weight, based upon the weight of the total composition. Among the dietary fats and carbohydrates are included dietary fats such as liquid soy and lecithin and carbohydrates such as fructose and fructo-oligosacharide.

In addition it is also desirable to incorporate edible sleep inducing agents in this composition to ensure that deep sleep is produced and that there is a release of human growth hormone by the pituitary gland so that it coincides with the release of the dietary proteins and amino acids from the composition of this invention. Any conventional dietary accepted sleeping agent such as passion flower extract, chamomile extract, valerian root extract or melatonin can be incorporated into the composition of this invention for the purpose of inducing sleep. Generally these sleep inducing agents are present in the rapid release portion in an amount of from 0.1% to 1% by weight based upon the total weight of the composition. In addition, various ingredients such as L-taurine and acetyl-L-carnitine can be added for increasing a nighttime release of growth hormone and coinciding this release with the release of the dietary and nutrient proteins and amino acids.

The composition of this invention, may contain conventional carriers flavorents, coloring agents and/or other incipients to enhance the taste, feel and flavor of the composition. These include such ingredients as sucrose, sweeteners, or flavorings, etc. In addition, vitamins, herbs, minerals and nutrients can be added to this composition and provide desired properties which are conventional in the art.

Some modifications to the embodiments of the invention will be apparent to those skilled in the art by the foregoing description. The description and the following examples are to be considered as illustrative only for the purpose of teaching those skilled in the art how to carry out the invention.

EXAMPLE 1

Preparation of 48 gram Powder

Microencapsulated Protein Mix

|  | Grams | % by weight |
|---|---|---|
| Milk Protein concentrate: | 3.0 g | 6.3% |
| Whey Protein concentrate: | 3.0 g | 6.3% |
| L-Leucine | 0.6 g | 1.3% |
| Isoleucine | 0.3 g | 0.6% |
| Valine | 0.3 g | 0.6% |
| Glutamine | 1.0 mg | |
| TOTAL | 7.2 g | 15.1% |

Above Microencapsulated Protein

|  | Grams | % by weight |
|---|---|---|
| Whey Protein concentrate: | 8.4071 | 7.52% |
| Milk Protein concentrate: | 7.600 | 15.83% |
| Wheat Protein concentrate: | 2.250 | 4.69% |
| L-leucine | 1.140 | 2.38% |
| Isoleucine | 0.370 | 0.77% |
| Valine | 0.320 | 0.67% |
| Fructose | 7.678 | 16.00% |
| Acesulfame K | 0.090 | 0.19% |
| Cocoa 10/12 | 3.750 | 7.81% |
| Vanilla Flavor | 0.225 | 0.47% |
| Soy creamer | 4.950 | 10.31% |
| Fructo-oligosaccharide | 0.450 | 0.94% |
| Vitamin Blend | 0.090 | 0.19% |
| Vitamin A 1250 IU | | |
| Vitamin E 7.5 IU | | |
| Selenium 17.5 mcg | | |
| Copper .5 mg | | |
| Soy Oil | 0.405 | 0.84% |
| Lecithin | 0.225 | 0.47% |
| Anabolic Mix | | |
| Magnesium aspartate | 2.300 | 4.79% |
| Zinc chelazome | 0.144 | 0.30% |
| Vit B6 | 0.01125 | 0.02% |
| DEEP SLEEP MIX | | |
| Passion Flower Extract (1.5% isoflavones) | 0.1125 | 0.23% |
| Chamomile Extract (1.2% flavonoids) | 0.1125 | 0.23% |
| Valerian root Extract | 0.16875 | 0.35% |
| (0.85 valeric acid) | | |
| TOTAL | 48.000 g | 100.00% |

EXAMPLE 2

Preparation of 45.15 gram Packet

Microencapsulated Protein Mix

|  | Grams | % by weight |
|---|---|---|
| Milk Protein concentrate: | 3.0 g | 6.3% |
| Whey Protein concentrate: | 3.0 g | 6.3% |

-continued

|  | Grams | % by weight |
|---|---|---|
| L-Leucine | 0.6 g | 1.3% |
| Isoleucine | 0.3 g | 0.6% |
| Valine | 0.3 g | 0.6% |
| Glutamine | 0.001 g | |
| TOTAL | 7.2 g | 15.9% |

Above Microencapsulated Protein Mix

| | Grams | % by weight |
|---|---|---|
| Whey Protein concentrate: | 8.407 | 18.62% |
| Milk Protein concentrate: | 7.600 | 16.83% |
| Wheat Protein concentrate: | 2.250 | 4.98% |
| L-leucine | 1.140 | 2.52% |
| Isoleucine | 0.370 | 0.82% |
| Valine | 0.320 | 0.71% |
| Fructose | 7.678 | 17.01% |
| Acesulfame K | 0.090 | 0.20% |
| Cocoa 10/12 | 3.750 | 8.30% |
| Vanilla Flavor | 0.225 | 0.50% |
| Soy creamer | 4.950 | 10.96% |
| Fructo-oligosaccharide | 0.450 | 1.00% |
| Vitamin Blend | 0.090 | 0.20% |
| Vitamin A 1250 IU | | |
| Vitamin E 7.5 IU | | |
| Selenium 17.5 mcg | | |
| Copper .5 mg | | |
| Soy Oil | 0.405 | 0.90% |
| Lecithin | 0.225 | 0.50% |
| TOTAL | 45.151 g | 100.00% |

EXAMPLE 3

Preparation of 48 grams of the Composition

Microencapsulated Protein Mix

| | Grams | % by weight |
|---|---|---|
| Milk Protein concentrate: | 3.0 | 6.2% |
| Whey Protein concentrate: | 3.0 | 6.2% |
| L-Leucine | 0.6 | 1.3% |
| Isoleucine | 0.3 | 0.6% |
| Valine | 0.3 | 0.6% |
| Glutamine | 0.001 | — |
| TOTAL | 7.201 g | 14.9% |

Above Microencapsulated Protein Mix

| | Grams | % by weight |
|---|---|---|
| Whey Protein concentrate: | 8.407 | 17.48% |
| Milk Protein concentrate: | 7.600 | 15.80% |
| Wheat Protein concentrate: | 2.250 | 4.68% |
| L-leucine | 1.140 | 2.37% |
| Isoleucine | 0.370 | 0.77% |
| Valine | 0.320 | 0.66% |
| Glutamine Peptide | 0.500 | 1.04% |
| Fructose | 7.678 | 15.96% |
| Acesulfame K | 0.090 | 0.19% |
| Cocoa 10/12 | 3.750 | 7.80% |
| Vanilla Flavor | 0.225 | 0.47% |
| Soy creamer | 4.950 | 10.29% |
| Fructo-oligosaccharide | 0.450 | 0.93% |
| Vitamin Blend | 0.090 | 0.19% |
| Vitamin A 1250 IU | | |
| Vitamin E 7.5 IU | | |
| Selenium 17.5 mcg | | |
| Copper .5 mg | | |
| Soy Oil | 0.405 | 0.84% |
| Lecithin | 0.225 | 0.47% |
| A–C Mix: | | |
| Bovine Colostrum-10% | 0.750 | 1.56% |
| Taurine | 1.0 | 2.08% |
| Acetyl-L-Carnitine (HCL) | 0.400 | 0.83% |
| Alpha Lipoic Acid | 0.100 | 0.21% |
| NIGHTTIME FORMULA 4: DEEP SLEEP MIX | | |
| Passion Flower Extract (1.5% isoflavones) | 0.0563 | 0.12% |
| Chamomile Extract (1.2% flavonoids) | 0.0563 | 0.12% |
| Valerian root Extract (0.85 valeric acid) | 0.0844 | 0.17% |
| Melatonin | 0.0005 | — |
| TOTAL | 48.0980g | 100.00% |

What is claimed is:

1. A nutritional composition comprising a mixture of nutritional food proteins and edible amino acids, said mixture being present in two portions, the first of which contains said mixture in microencapsulated form for sustained release and the second portion contains said mixture in a form for rapid release, said first portion containing from about 15% to about 70% by weight of said mixture and said second portion containing from about 15% to about 70% by weight of said mixture, wherein said nutritional food proteins are selected from the group consisting of milk proteins, whey protein, wheat protein, soy protein and mixtures thereof.

2. The composition of claim 1 wherein the nutritional food proteins are present in the mixture in an amount of from about 10% to about 95% by weight of the mixture and the edible amino acids are present in an amount of from about 5% to about 90% by weight of the mixture.

3. The composition of claim 2 wherein said composition is a dry powder.

4. The composition of claim 3 wherein the edible amino acids are the essential amino acids or mixtures thereof.

5. The composition of claim 4 wherein the mixture contains glutamine and lecithin in addition to the essential amino acids.

6. The composition of claim 5 wherein said composition contains from about 2% to about 10% by weight of anabolic agents present in the rapid release portion.

7. The composition of claim 6 wherein said composition contains from about 0.1% to about 2% by weight of micronutrients present in the rapid release portion.

8. The composition of claim 7 wherein said composition contains from about 0.1% to about 2% by weight of sleep inducing agents present in the rapid release portion.

9. The composition of claim 2 wherein said composition is present in oral unit dosage form.

10. The composition of claim 9 wherein the nutritional food proteins are selected from the group consisting of milk proteins, whey protein, wheat protein, soy protein and mixtures thereof.

11. The composition of claim 10 wherein the edible amino acids are the essential amino acids or mixtures thereof.

12. The composition of claim 11 wherein the mixture contains glutamine and lecithin in addition to the essential amino acids.

13. The composition of claim 12 wherein said composition contains from about 2% to about 10% by weight of anabolic agents present in the rapid release portion.

14. The composition of claim 13 wherein said composition contains from about 0.1% to about 2% by weight of micronutrients present in the rapid release portion.

15. The composition of claim 14 wherein said composition contains from about 0.1% to about 1% by weight of sleep inducing agents present in the rapid release portion.

16. The composition of claim 5 wherein said composition contains from about 2% to about 10% by weight of an anabolic agent selected from the group consisting of Vitamin B6, zinc chelazome, magnesium aspartate or mixtures thereof, said anabolic agent being present in the rapid release portion.

17. The composition of claim 7 wherein said composition contains from about 0.1% to about 1% by weight of sleep inducing agents selected from the group consisting of passion flower extract, chamomile extract, valerian root extract or melatonin, said sleep inducing agent being present in the rapid release portion.

18. The composition of claim 12 wherein said composition contains from about 2% to about 10% by weight of an anabolic agent selected from the group consisting of Vitamin B6, zinc chelazome, magnesium aspartate or mixtures thereof, said anabolic agent being present in the rapid release portion.

19. The composition of claim 15 wherein said composition contains from about 0.1% to about 1% by weight of sleep inducing agents selected from the group consisting of passion flower extract, chamomile extract, valerian root extract or melatonin, said sleep inducing agent being present in the rapid release portion.

* * * * *